Patented Apr. 7, 1931

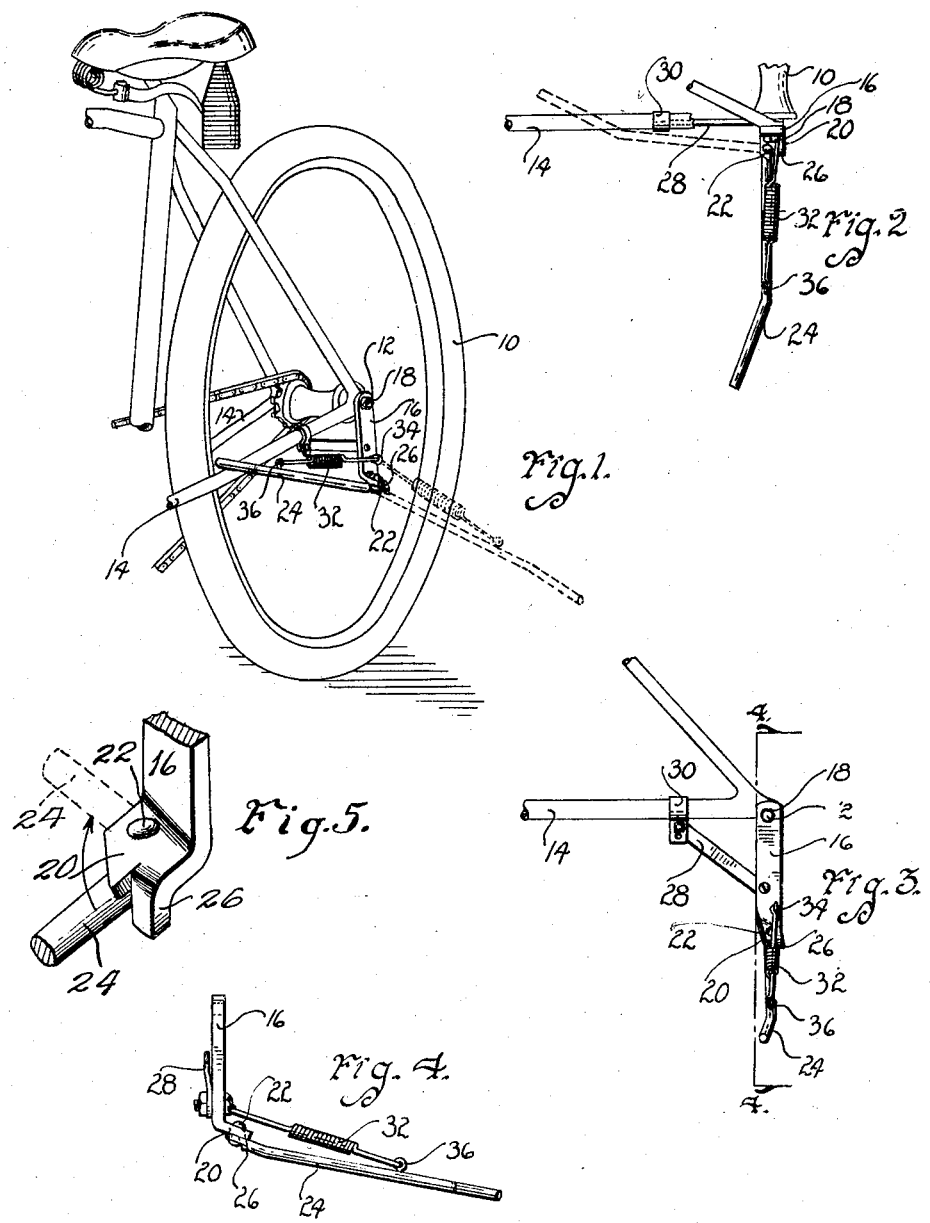

1,799,573

UNITED STATES PATENT OFFICE

THOMAS THOMPSON, OF DES MOINES, IOWA, ASSIGNOR, BY MESNE ASSIGNMENTS, TO JOSEPH W. SULLIVAN AND LEO J. COLEMAN, BOTH OF DES MOINES, IOWA

BICYCLE STAND

Application filed October 28, 1929. Serial No. 403,079.

This application is a continuation in part of my application filed March 2, 1928, Serial Number 258,647.

The object of this invention is to provide a bicycle stand of simple and inexpensive construction and which may be readily secured to a bicycle and adjusted to hold the same in upright position or to be folded out of the way when it is desired to use the bicycle.

A further object of the invention is to provide an improved construction for a folding bicycle stand having a pivoted leg which is placed under spring tension for holding it in operative or inoperative position.

Still a further object is to provide improved means for mounting the device on a bicycle.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view showing the rear portion of a bicycle having my stand applied thereto, the device being shown by solid lines in inoperative position, and by dotted lines in operative position.

Figure 2 is a plan view showing portions of the frame and rear axle of the bicycle and showing the stand by solid lines in operative position and by dotted lines in inoperative position.

Figure 3 is a side elevation of the parts shown in Figure 2, the stand being shown in operative position.

Figure 4 is a front elevation of the same, partly in section on the line 4—4 of Figure 3.

In the accompanying drawings I have shown a portion of a bicycle having a rear wheel 10 rotatably mounted on an axle 12 carried by the rear ends of spaced frame members 14.

The stand includes a bracket 16 which is formed at its upper end with an opening to receive the axle 12 of the bicycle, the bracket being mounted on the projecting end of the axle, outside of the bicycle frame members such as 14, and held in place by the nut 18 which is ordinarily employed for securing the frame members, wheel and axle in assembled relation. The bracket 16 may be formed of a strap or bar of metal and it extends downwardly from the axle 12 substantially in a vertical plane.

At its lower end the bracket 16 is offset or bent outwardly on an obtuse angle to provide an attaching ear 20 which is formed with an opening to receive a pivot bolt or rivet 22.

A leg 24 is pivotally secured to the bracket by means of the pivot 22 and said leg is adapted to extend outwardly and downwardly from the bracket, as a continuation of the inclined ear 20, for forming a lateral support by means of which the bicycle may be held in substantially upright position. The lower end of the leg 24 preferably is bent laterally at an angle to increase the amount of surface which may contact with the floor or ground when the device is in operative position.

The attaching ear 20 is split longitudinally at its outer end and the rear portion thereof is bent downwardly to form a stop lug 26 which serves to limit rearward pivotal movement of the leg 24.

The bracket may be suitably braced to the bicycle frame by means of a brace member 28 attached to an intermediate point of the bracket and adapted to be secured by a clamp member 30 to a horizontal frame member 14 of the bicycle at a point spaced forwardly of the axle 12.

A tension coil spring 32 is fixed at one end to the bracket 16 by means of an eye 34 and at its opposite end to the leg 24 by means of an eye 36. When it is desired to use the bicycle the stand may be placed in operative position by applying pressure to the leg 24 to cause it to swing through an arc toward the frame member 14 as shown by solid lines in Figure 1. It will be noted that because of the inclined position of the attaching ear 20, the free end of the leg 24 will be caused to move upwardly as well as inwardly toward the bicycle, so that when it reaches its limit of movement it will be in contact with the frame member 14 as shown.

When the pivoted leg 24 reaches the limit of movement and is in inoperative position, the tension spring 32 serves to hold it yieldingly in such position because the eye 36 on said leg has then moved to a position past the center line drawn through the other eye eye 34 on the bracket.

The tension spring 32 serves to hold the supporting leg 24 under tension at all times so that it will not move too freely on its pivot. A slight amount of force applied to move the free end of the leg 24 forwardly will permit the outer end of the spring 32 to be carried to such a position that the spring thereafter will serve to carry the leg to inoperative position. It thus follows that in the event undue weight is placed on the bicycle or undue stress applied to the supporting leg while it is in operative position, the tendency will be for the leg to be swung forwardly and upwardly under the influence of the spring 32. In other words, there will be a tendency for the leg to move to inoperative position rather than to remain in such position that the parts might be bent or otherwise injured.

It is obvious that I have provided an effective stand for bicycles which is simple and inexpensive to construct and which is very easily applied to a bicycle. It is also obvious that this stand may be quickly and easily adjusted from one position to another and that when it is in inoperative position it is entirely out of the way and does not interfere with the operation of the bicycle.

I claim as my invention:

1. A stand for bicycles comprising a bracket having an opening to receive the rear axle of the bicycle, a brace extending forwardly and upwardly from said bracket, a clamp member for attaching said brace to a bicycle frame member, the lower end of said bracket being bent outwardly at an angle to form an attaching lug, a leg pivoted to said attaching lug, said leg adapted to extend outwardly from said lug for supporting the bicycle in substantially upright position and also adapted to be swung upwardly through an arc to inoperative position, a coil spring attached at its ends respectively to the bracket and the leg, and a stop on said bracket for limiting rearward movement of said leg, the end of said spring attached to the leg being arranged to travel past the center line between its other end and the pivot of said leg, whereby the spring is arranged for holding the leg either in operative or inoperative position.

2. A stand for bicycles comprising a bracket having an opening to receive the rear axle of the bicycle, the lower end of said bracket being bent outwardly at an angle to form an attaching lug, a leg pivoted to said attaching lug, a coil spring attached at its ends respectively to the bracket and the leg and arranged for yieldingly holding said leg in position, the lower end of said attaching lug being split, the rear member of said split portion being bent downwardly to form a stop lug for limiting rearward movement of said leg.

Des Moines, Iowa, September 25, 1929.

THOMAS THOMPSON.